United States Patent [19]
Alexander et al.

[11] Patent Number: 5,456,516
[45] Date of Patent: Oct. 10, 1995

[54] AUTOMOTIVE VEHICLE SIDE WINDOW SYSTEM

[75] Inventors: Michael P. Alexander, Grosse Ile; Stephen P. Tokarz, Flat Rock, both of Mich.

[73] Assignee: ASC Incorporated, Southgate, Mich.

[21] Appl. No.: 162,847

[22] Filed: Dec. 6, 1993

[51] Int. Cl.⁶ .................................................. B60J 7/12
[52] U.S. Cl. ............................ 296/146.14; 296/147
[58] Field of Search ........................ 296/146.14, 147, 296/201

[56] References Cited

U.S. PATENT DOCUMENTS

| | | | |
|---|---|---|---|
| 3,536,354 | 10/1970 | Ingram | 296/146.14 |
| 4,720,133 | 1/1988 | Alexander et al. | 296/117 |
| 4,778,215 | 10/1988 | Ramaciotti | 296/107 |
| 4,784,428 | 11/1988 | Moy et al. | 296/107 |
| 4,828,317 | 5/1989 | Muscat | 296/122 |
| 4,854,634 | 8/1989 | Shiraishi et al. | 296/108 |
| 5,118,158 | 6/1992 | Truskolaski | 296/146.14 |

Primary Examiner—Joseph D. Pape
Attorney, Agent, or Firm—Harness, Dickey & Pierce

[57] ABSTRACT

An automotive side window system provides a mechanism for retracting and extending a side window into and away from an adjacent portion of a roof structure.

28 Claims, 6 Drawing Sheets

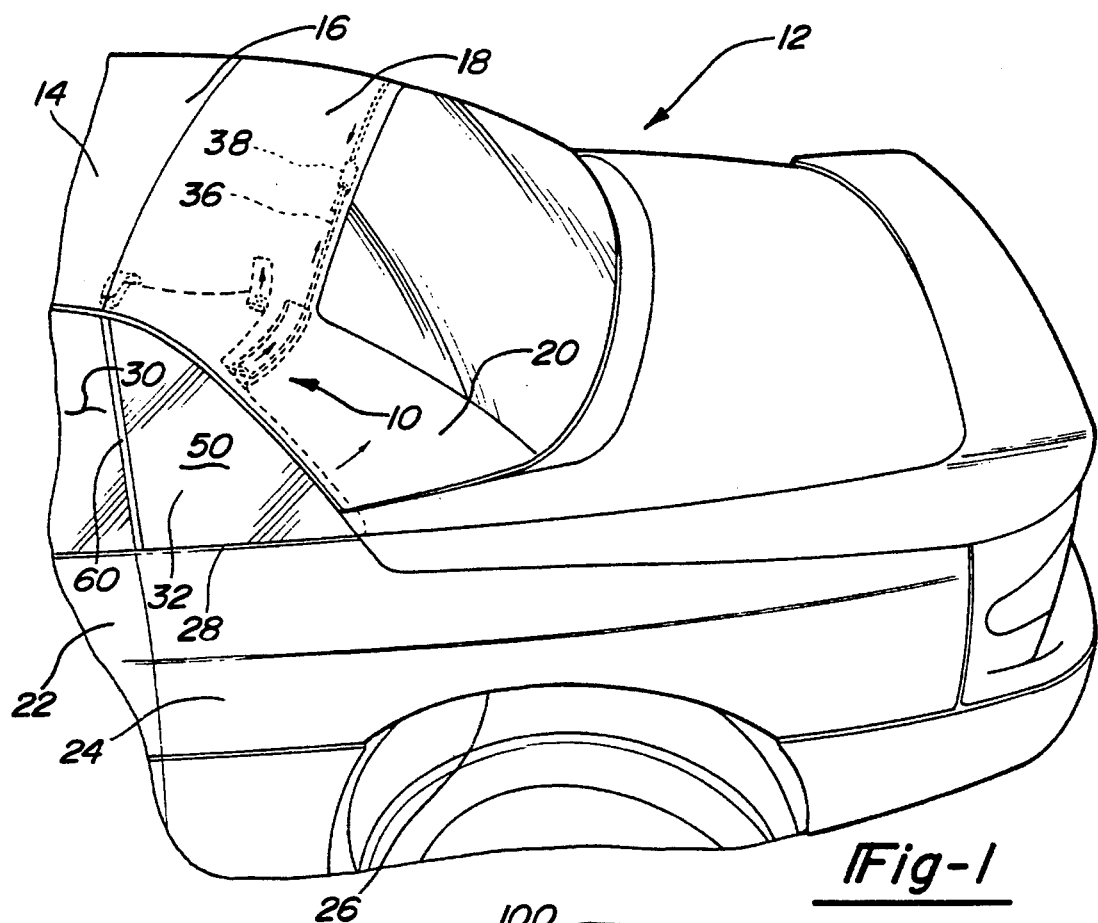
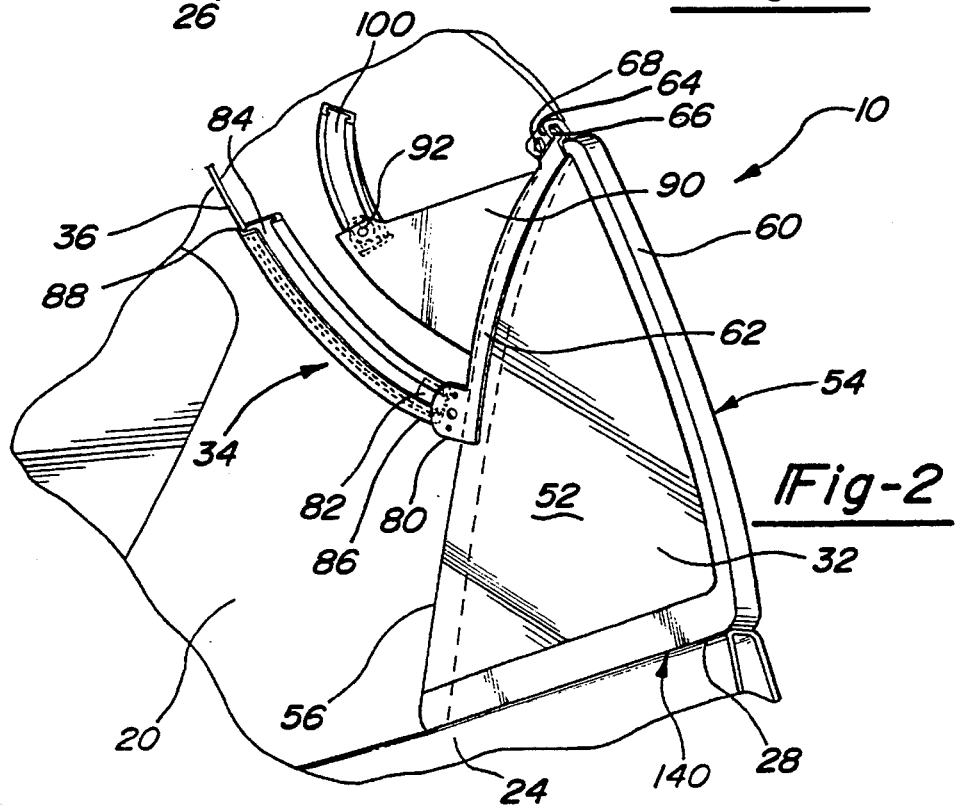

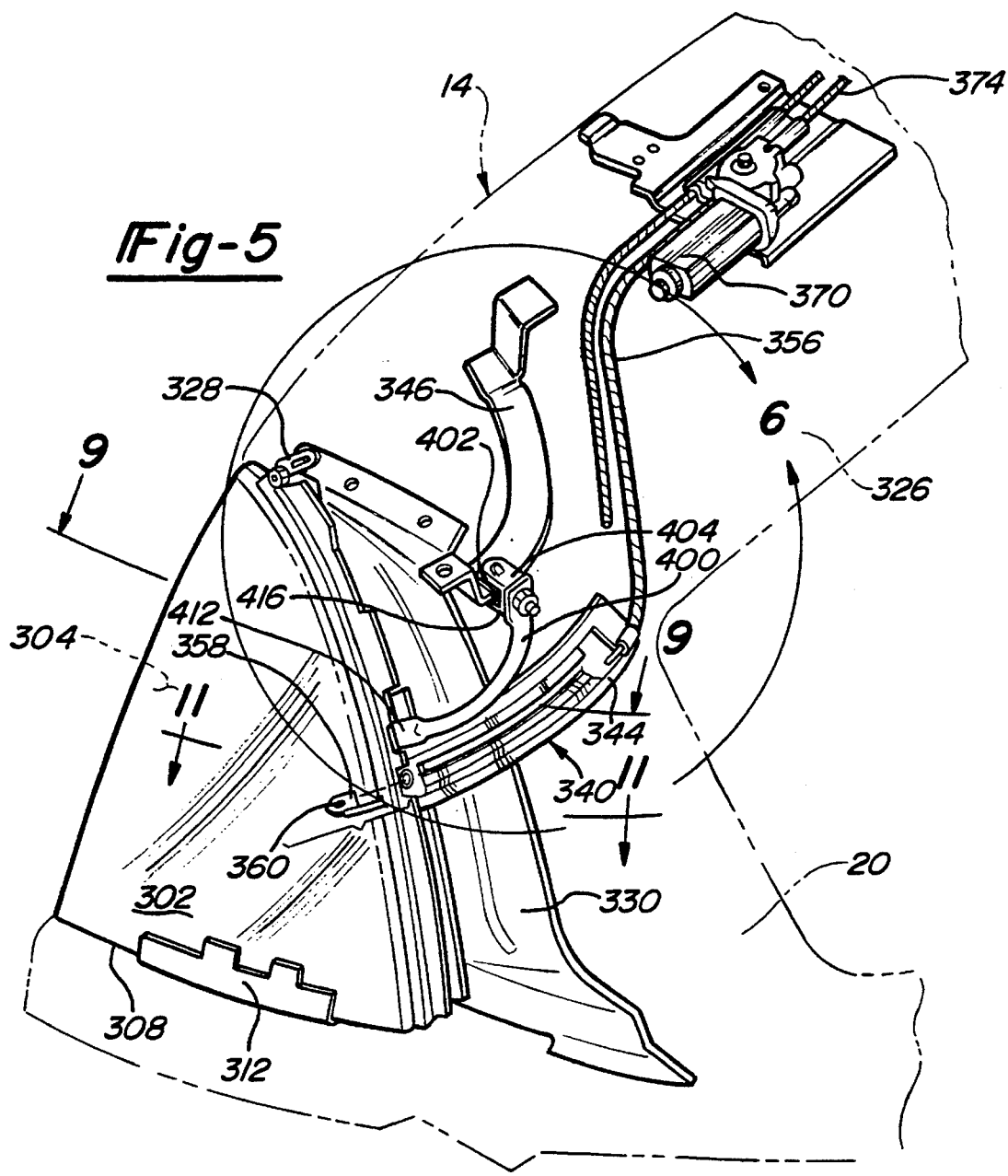
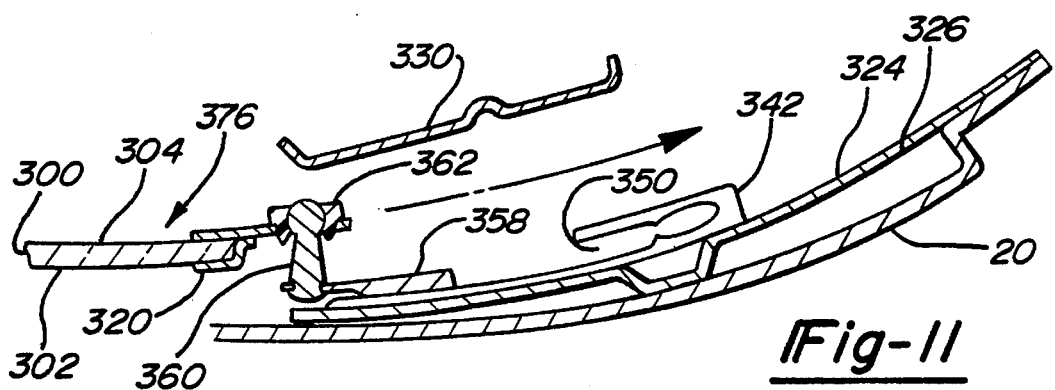

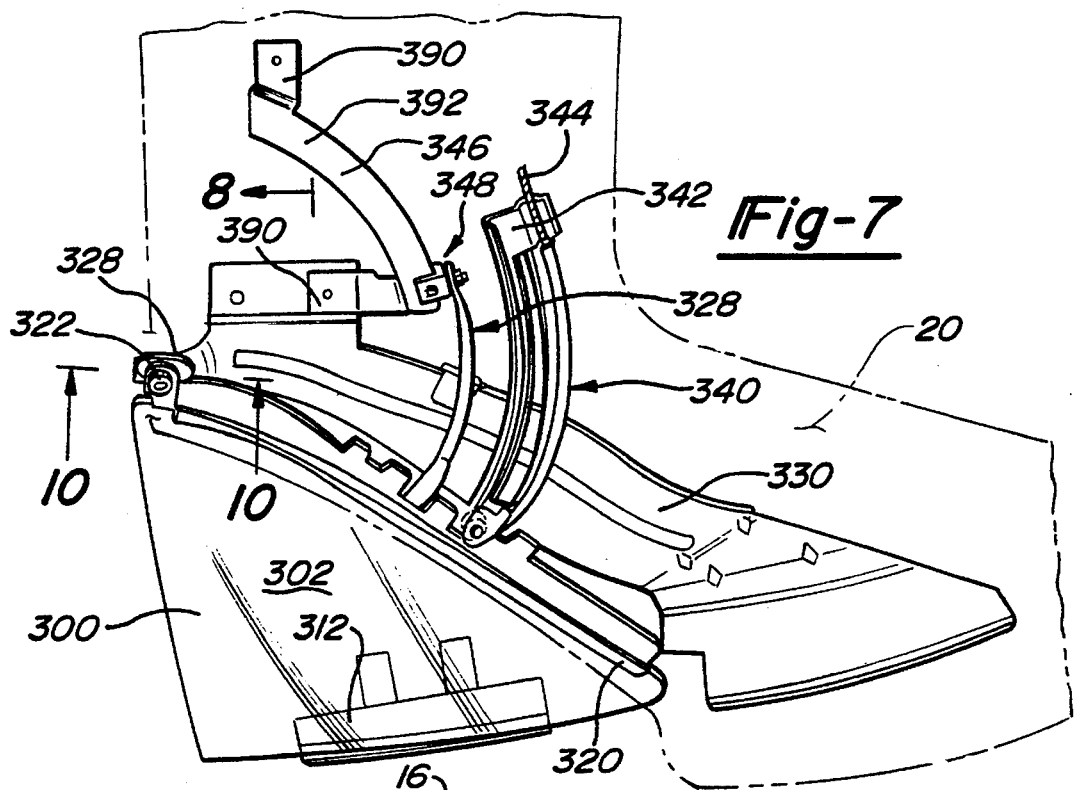
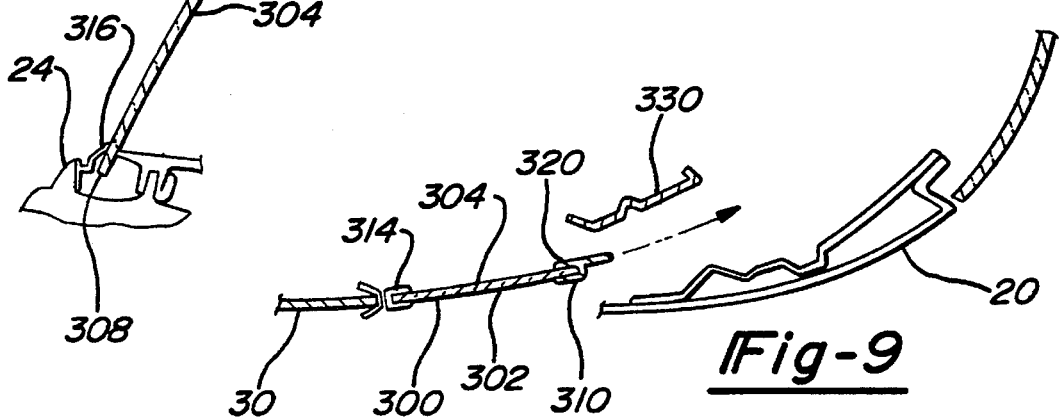

AUTOMOTIVE VEHICLE SIDE WINDOW SYSTEM

BACKGROUND AND SUMMARY OF THE INVENTION

This invention relates generally to window systems in an automotive vehicle and more specifically to a window which is retractable into the vehicle's roof structure.

In the field of automobile design, the ability to style the vehicle's body is often limited by manufacturability and durability of various components therein. For example, when dealing with retractable side windows, the ability to incorporate dramatic window shapes and curves is limited by the need to insure that the windows retract easily and provide a positive seal against elements such as wind and rain. Conventionally, the vehicle side windows are retractable into a cavity formed within a door panel or quarter panel below a beltline. This causes a variety of problems. First, the window must be fairly flat in order to minimize the width of the body panel cavity for receiving the retracted windows. Accordingly, some highly curved quarter windows are not retractable and, thus, must be fixed in an extended position. Second, it is often difficult to package retractable quarter windows due to protrusion of a wheel house into the desired cavity space. Third, it is often difficult to maintain an effective weather seal between these traditional retractable windows and the adjacent lower body panel. Since the top of the cavity is upwardly facing, rain can often enter the cavity despite the weather stripping. This water seepage often infiltrates the passenger compartment thereby causing premature failure of various electrical components and the like. In order to minimize this water intrusion problem, various corrosion resistant materials must be employed and a plurality of drain holes must be incorporated within the bottom of the panels to allow drainage of any accumulated water.

The retraction of the quarter window is especially important when used in combination with a retractable soft-top roof or a folding hard-top roof. Such a soft-top roof is disclosed in U.S. Pat. No. 4,720,133 entitled "Convertible Top Structure" which issued to the present assignee on Jan. 19, 1988, and is incorporated by reference herewithin. An exemplary hard-top roof is shown in U.S. Pat. No. 4,854,634 entitled "Upper Body Structure for a Convertible Vehicle" which issued to Shiraishi et al. on Aug. 8, 1989, and is also incorporated by reference herewithin. Traditionally, the quarter window must often be retracted within a cavity of the adjacent quarter panel prior to fully collapsing the soft-top or hard-top roof. Examples of two such retraction devices are depicted in U.S. Pat. No. 4,828,317 entitled "Convertible Top Frame with Quarter Windows" which issued to Muscat on May 9, 1989 and U.S. Pat. No. 4,784,428 entitled "Apparatus and Method of a Convertible Top with Hard Glass with Bottom Sealing" which issued to Moy et al. on Nov. 15, 1988. Accordingly, it would be desirable to have a side window, such as a quarter window, that is retractable into the adjacent roof structure.

In accordance with the present invention, a preferred embodiment of a new and useful side window system provides for retraction of a side window into the adjacent roof structure of an automobile. The side window system can be used in combination with a door window or a quarter window. The present invention is advantageous over the prior art in that it eliminates the need for extensive weatherstripping between the side window and the adjacent lower body panel. Furthermore, the associated water drain holes can be eliminated. Another advantage is that a highly curved side window can be easily retracted since obstructions, such as a wheel house and the like, do not need to be circumvented. Additional advantages and features of the present invention will become apparent from the following description and appended claims, taken in conjunction with the accompanying drawings.

BRIEF DESCRIPTION OF THE DRAWINGS

FIG. 1 is a fragmentary perspective view showing the rear quarter panel region of an automotive vehicle with a first preferred embodiment of a side window system of the present invention illustrated partially in phantom;

FIG. 2 is an enlarged fragmentary perspective view, taken from inside the vehicle, showing the present invention side window system of FIG. 1 in an extended position;

FIG. 5 is a perspective view, taken from the rear corner of the vehicle, showing the second preferred embodiment of the present invention side window system of FIG. 4 in an extended position in relation to a roof structure;

FIG. 7 is a top elevational view showing the second preferred embodiment of the present invention side window system of FIG. 4;

FIG. 8 is a cross sectional view, taken along line 8—8 of FIG. 7, showing the second preferred embodiment of the present invention side window system;

FIG. 9 is a cross sectional view, taken along line 9—9 of FIG. 5, showing the second preferred embodiment of the present invention side window system;

FIG. 10 is a cross sectional view, taken along line 10—10 of FIG. 7, showing the second preferred embodiment of the present invention side window system; and FIG. 11 is a cross sectional view, taken along line 11—11 of FIG. 5, showing the second preferred embodiment of the present invention side window system.

DETAILED DESCRIPTION OF THE PREFERRED EMBODIMENTS

Figure 3:
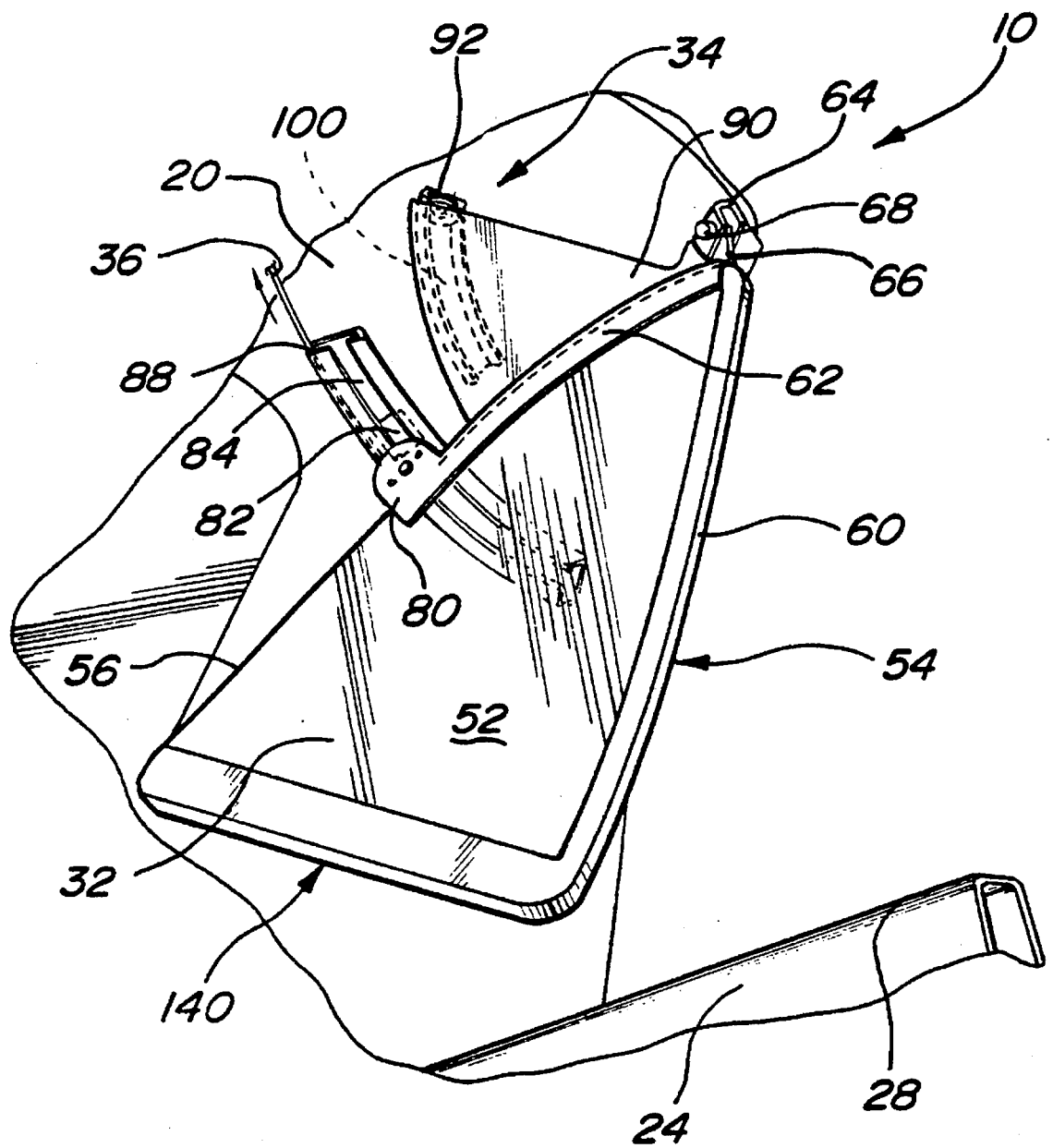
FIG. 3 is an enlarged fragmentary perspective view, similar to that of FIG. 2, showing the present invention side window system of FIG. 1 in a retracted position.

In general, automotive vehicles have side windows such as those located above the vehicle's doors and above the quarter panels. The preferred embodiments of the present invention provide a means for retracting such a window, especially for a quarter window, into an adjacent roof structure of the vehicle. Although these embodiments are directed to an automotive vehicle having a folding hard-top, it can be appreciated by those of ordinary skill in the art that the concepts disclosed hereinafter may be equally applicable to vehicles having a convertible soft-top roof or having a fixed roof.

Referring to FIG. 1, a first preferred embodiment of a side window system 10 is shown in relation to an automotive vehicle 12. Automotive vehicle 12 has a roof structure 14 which includes a foldable hard-top front roof 16, a foldable hard-top rear roof 18, an A-pillar (not shown), a B-pillar 20, an inner rear roof reinforcement 326 (see FIG. 4) and a reinforcement plate 330 (see FIG. 4). Automotive vehicle 12 further has a pair of doors 22, a pair of quarter panels 24 and a pair of wheel wells 26 protruding upwardly therein. A beltline 28 is defined as the portions of door 22 and quarter panel 24 where they externally intersect an adjacent door side window 30 and a quarter side window 32.

As is illustrated in FIGS. 1–3, each side window system 10 is comprised of quarter window 32, a guiding mechanism 34, a connector or drive cable 36, and an actuator 38. Quarter window 32 is substantially triangular in shape having an exterior face 50 and an interior face 52, both of which are bounded by a front peripheral edge 54, a rear peripheral edge 56 and a bottom peripheral edge 58. Front and bottom peripheral edges 54 and 58, respectively, are encapsulated within a weatherstrip 60. This provides a simplistic water resistant seal against the adjacent door side window 30 and quarter panel 24.

Quarter window 32 further has a metallic channel 62 affixed along an upper portion of rear peripheral edge 56. A U-shaped clip 64 is fastened upon a tab 66 of channel 62 near an upper segment thereof so as to provide a pivot engaging means around a pivot member 68 which is mounted, for example, to the inside of rear roof 18. A flange 80 extends from a lower segment of channel 62 and has an engagement device, such as a nylon carrier 82, rotatably attached thereto which rides longitudinally within guide mechanism 34 otherwise known as a primary track 84. Cable 36 is preferably made from a stiff braided stainless steel material and is operably secured at a distal end 86 thereof to flange 80. Cable 36 is attached to rear roof 18 within a cable sheath or guide 88. Moreover, a fin member 90 protrudes from a median segment of channel 62. Fin member 90 is substantially triangular in shape and has a second nylon carrier 92 rotatably attached thereto. Second carrier 92 operably travels within a second track 100 so as to stabilize and direct the movement of quarter window 32 during retraction. Tracks 84 and 100 are preferably stamped from sheet steel.

Actuator 38 is preferably a fractional horse power dc motor having a geared drive system which simultaneously actuates both the left and right side cables 36 mounted thereto. Accordingly, when the vehicle occupant electrically opens or closes roof structure 14, a single actuator 38 selectively pushes or pulls both cables 36 thereby moving quarter windows 32. In FIG. 2 quarter window 32 is illustrated in its extended position. Subsequently, quarter window 32 is retractable to the position shown in FIG. 3. For both folding hard-top and convertible soft-top roof constructions, side window system 10 is designed to retract both pairs of symmetrical quarter windows 32 in unison prior to retracting roof structure 14.

A second preferred embodiment of the present invention quarter window system is shown in FIGS. 4, 5 and 7 through 9. In this embodiment, quarter window 300 has an exterior face 302, an interior face 304, both of which are bordered by a front peripheral edge 306, a bottom peripheral edge 308 and a rear peripheral edge 310. A guide 312 is affixed to bottom peripheral edge 308. Front peripheral edge 306 abuts against a simplistic weatherstrip 314 attached to door side window 30 and bottom peripheral edge 308 is receivable within a simplistic weatherstrip 316 attached to quarter panel 24. A metallic channel 320 is also affixed to quarter window 300 along rear peripheral edge 310.

Figure 4:
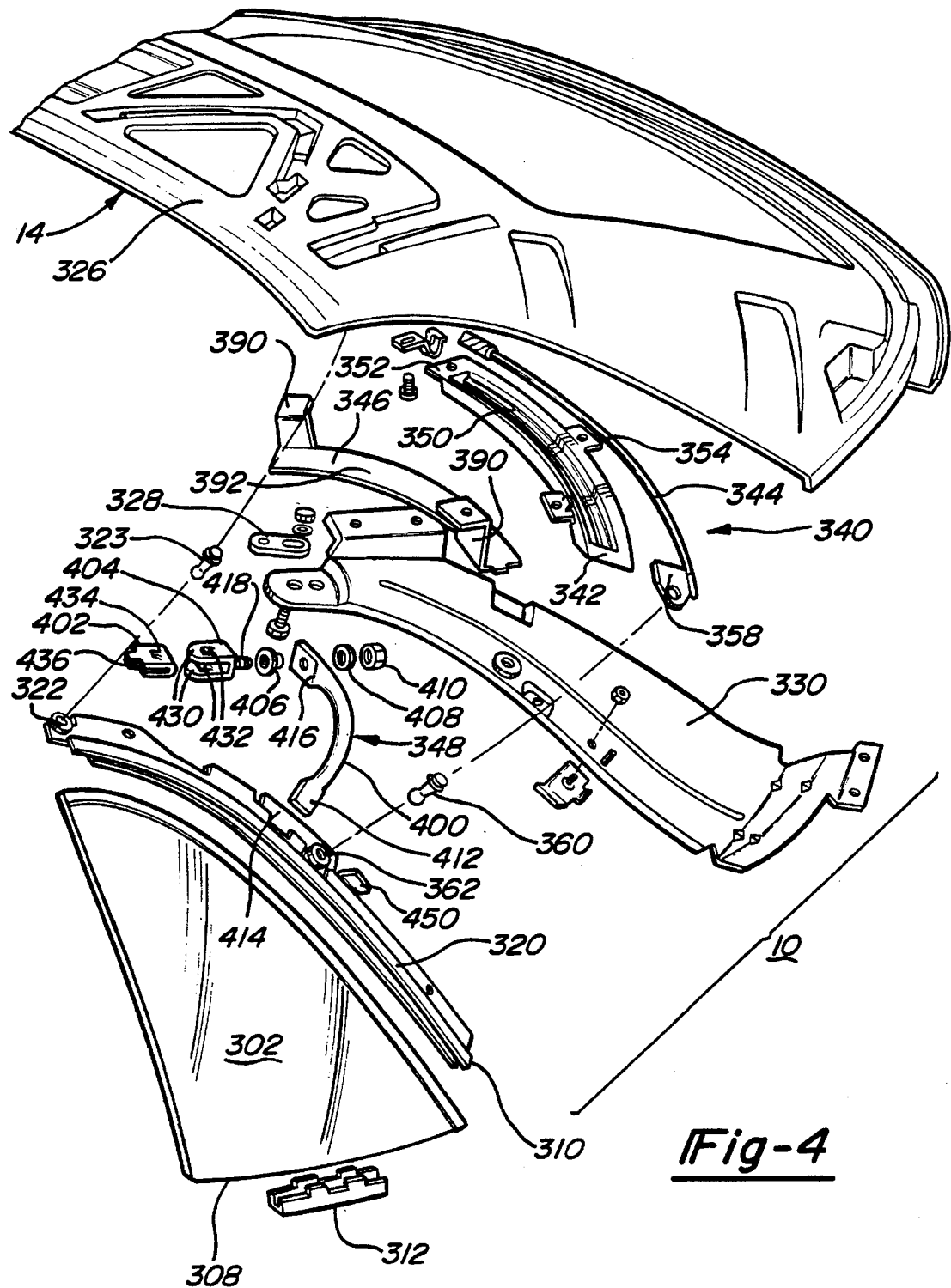
FIG. 4 is an exploded perspective view showing a second preferred embodiment of the side window system of the present invention.
Figure 6:
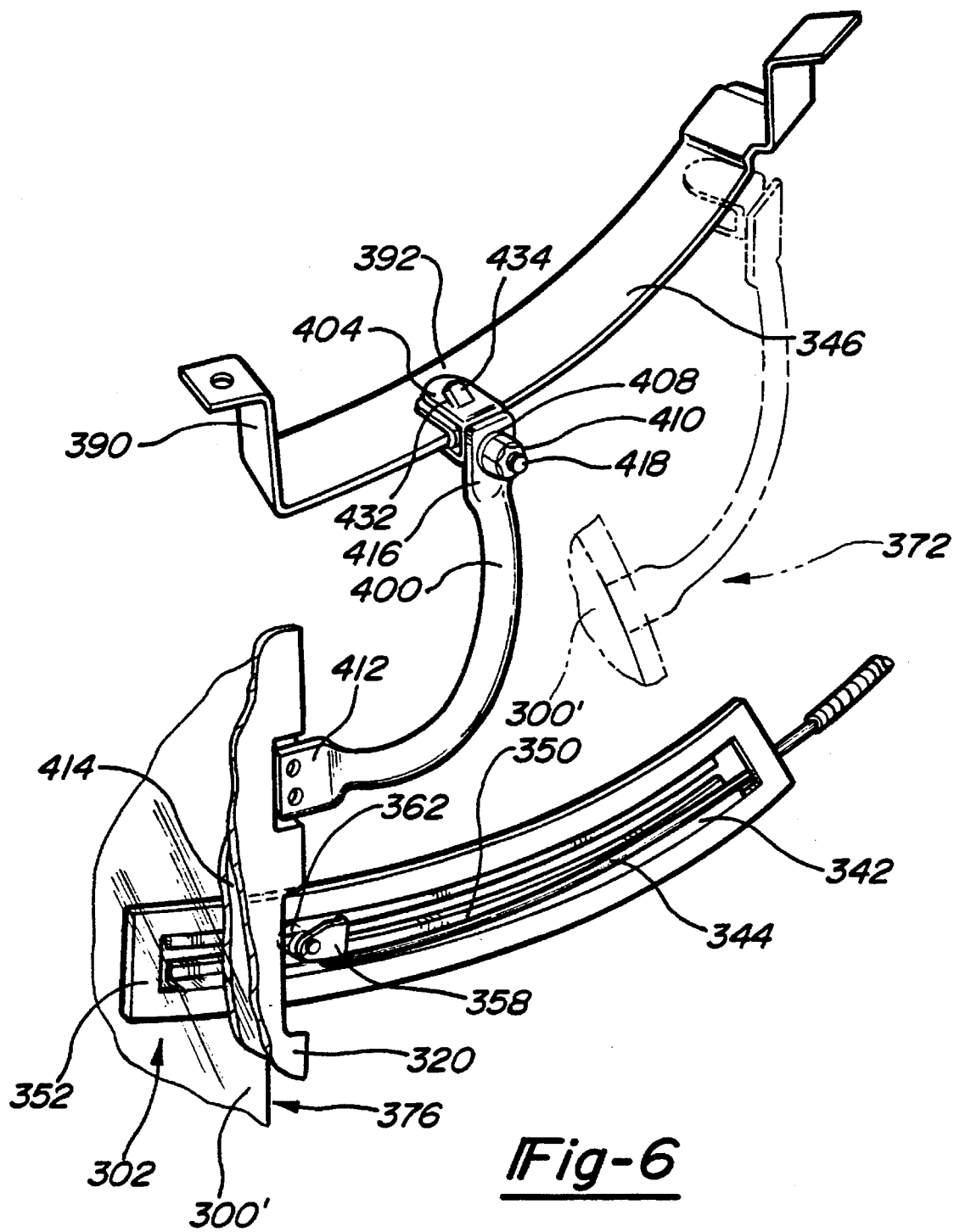
FIG. 6 is an enlarged fragmentary perspective view, taken within circle 6—6 of FIG. 5, showing the second preferred embodiment of the present invention side window system.

Referring to FIGS. 4 and 10, a socket 322 is shown located proximate to an upper portion of channel 320 and mates with a ball-like pivot member 323 attached to a pivot adjustment bracket 328. Pivot adjustment bracket 328 is mounted upon metallic reinforcement plate 330 which is, in turn, retained against an inboard surface 324 of inner rear roof reinforcement 326. Quarter window 300 is thus sandwiched therebetween. Inner rear roof reinforcement 326 is covered by an exterior panel of rear roof 18 and an exterior panel of B-pillar 20 (see FIG. 1).

As can be best observed in FIGS. 4 through 7 and 11, a guiding mechanism 340 is comprised of a first track 342, a connector 344, a second track 46 and a link assembly 348. First track 342 has an elongated arcuate shape with a receptacle portion 350 and an outer set of flanges 352. Flanges 352 of first track 42 are attached to inboard surface 324 of inner rear roof reinforcement 326. In concert therewith, connector 344 partially rides within receptacle portion 350 of first track 342. Connector 344 is constructed from a stiff spiral coil steel cable 354 with an engagement device 358 attached thereto. Between first track 342 and an actuator 370, cable 354 is coaxially surrounded by a guide 356 mounted to inner rear roof reinforcement 326. Engagement device 358 has a ball and post element 360 extending therefrom which rotatably engages with a socket 362 mounted upon a median portion of channel 320. Accordingly, when the motorized actuator 370 pulls upon cable 354, quarter window 300' will retract to position 372 (see FIG. 6). A portion of cable 354 will in turn, extend through run out guide 374. Subsequently, when actuator 370 pushes cable 354, quarter window 300 will be in an extended operable position 376 (see FIG. 5).

Second track 346 is defined by a pair of offset segments 390 joined by an arcuately shaped cam segment 392. Offset segments 390 are fastened to inboard surface 324 of inner rear roof reinforcement 326 such that cam segment 392 is displaced inboard therefrom. Link assembly 328 acts in combination with cam segment 392 of second track 346 so as to stabilize and guide quarter window 300 during retraction and extension thereof. Link assembly 348 is comprised of a rigid link member 400, a clip 402, a yoke 404, a bushing 406, a washer 408 and a nut 410. Link member 400 has a first end 412 which is welded to a flange 414 extending from the median portion of channel 320 proximate with socket 362. A second end 416 of link member 400 has an aperture therethrough within which is located bushing 406 and a threaded portion 418 of yoke 404. Washer 408 and nut 410 fasten threaded portion 418 of yoke 404 to second end 416 of link member 400. Yoke 404 can thus rotate in relation to link member 400. Yoke 404 further has a pair of bifurcated members 430 with orifices 432 therethrough in alignment with one another such that a pair of opposing fingers 434 of clip 402 can be rotatably engaged therewith. Clip 402 is substantially U-shaped in configuration such that an inner cavity 436 slidably surrounds cam segment 392 of second track 346. Channel 320 further has an upturned flange 450 which abuts against an inwardly turned finger 452 projecting from a stop member 454. Stop member 454 is bolted onto reinforcement plate 330 so as to provide an extension stop for quarter window 300. It should be noted that in this embodiment, a single actuator 370 operates both the symmetrical left side and right side quarter windows 300 in unison.

While the preferred embodiments of this quarter window system have been disclosed, it will be appreciated that various modifications may be made without departing from the present invention. For example, the quarter window may be slidably retractable into the roof structure without use of a pivot. A pair of independent remotely located hand-crank or motorized actuators may also be used. Furthermore, a motor and drive system may be directly attached to each quarter window thereby eliminating the need for cables. Additionally, the guiding mechanism can be a rod, or tongue and grooved sliding interlock system rather than a track. The side windows adjacent to the vehicle's doors may also be retracted into the vehicle roof. Moreover, while specific materials have been disclosed in an exemplary fashion, various other materials may of course be employed. It is intended by the following claims to cover these and any other departures from the disclosed embodiments which fall within the true spirit of this invention.

The invention claimed is:

1. A side window system used in an automotive vehicle having a beltline and a roof structure disposed above said beltline, said side window system comprising:

a side window having an exterior face, an interior face, a front peripheral edge, a bottom peripheral edge and a rear peripheral edge;

a first guiding mechanism attached to said roof structure;

a connector coupled to said side window for interfacing with said first guiding mechanism; and an actuator coupled to said connector operable to retract said side window toward said roof structure adjacent thereto and operable to extend said side window to a position with said bottom peripheral edge thereof disposed adjacent said beltline of said automotive vehicle.

2. The side window system of claim 1 wherein:

said actuator includes a fractional horse power dc motor.

3. The side window system of claim 2 further comprising:

a channel attached to said rear peripheral edge of said side window;

said first guiding mechanism having a longitudinal arcuate shape; and said connector including a first engagement device coupled to said channel for slidable engagement with said first track.

4. The side window system of claim 3 wherein said connector also includes:

a cable movably engaged with said motor and further having a distal end thereof connected to said channel which is attached to said side window, said motor movably driving said cable for retracting and extending said side window.

5. The side window system of claim 4 wherein:

said cable is slidable within said first guiding mechanism.

6. The side window system of claim 1 further comprising:

a second guiding mechanism having a longitudinal arcuate shape, said second guiding mechanism being attached to said roof structure;

a member extending substantially rearwardly from said side window;

a second engagement device rotatably attached to said member extending from said side window for slidable engagement with said second guiding mechanism.

7. The side window system of claim 6 wherein:

said second guiding mechanism has a pair of stand off segments and a cam segment disposed therebetween, said pair of stand off segments being attached to said roof structure such that said cam segment is displaced away therefrom; and said second engagement device slidably interfaces with a portion of said cam segment in registry therewith and slidably moves therealong during retraction and extension of said side window.

8. The side window system of claim 7 wherein:

said second engagement device includes a clip and a yoke, said clip slidably interfacing with said cam segment of said second guiding mechanism and said yoke being rotatably attached to said clip, said yoke being further rotatably attached to said member extending from said side window.

9. The side window system of claim 6 wherein:

said first and second guiding mechanisms have a C-shaped cross-sectional configuration within which the corresponding of said first and second engagement devices are slidably engagable.

10. The side window system of claim 1 wherein:

said side window is a quarter window being vertically adjacent to a quarter panel disposed therebelow.

11. The side window system of claim 10 wherein:

said quarter window retracts toward a pillar portion of said roof structure adjacent thereto.

12. The side window system of claim 11 wherein:

said front, bottom and rear peripheral edges of said quarter window intersect each other thereby forming a substantially triangular shape.

13. The side window system of claim 11 wherein:

said quarter window retracts inboard of said pillar with said exterior face of said quarter window adjacent to said pillar, said quarter window being substantially hidden from view when in a retracted position.

14. The side window system of claim 1 further comprising:

a pivot member attached to said roof structure such that said side window pivots thereabout when retracting or extending.

15. The side window system of claim 1 wherein:

said roof structure of said automotive vehicle includes a foldable rigid front roof and rear roof.

16. The side window system of claim 1 wherein:

said roof structure of said automotive vehicle includes a collapsible soft-top roof.

17. The side window system of claim 1 further comprising:

a second side window having an exterior face, an interior face, a front peripheral edge, a bottom peripheral edge and a rear peripheral edge; and a second guiding mechanism attached to said roof structure; and a second connector coupled to said second side window for interfacing with said second guiding mechanism said actuator coupled to said second connector operable to simultaneously retract said first and second side windows in unison toward said roof structure adjacent thereto and operable to simultaneously extend said first and second side windows in unison to a position with each of said bottom peripheral edges thereof juxtaposed against said beltline of said automotive vehicles.

18. The side window system of claim 1 wherein:

said side window is vertically adjacent to a door panel disposed therebelow.

19. A quarter window system used in an automotive vehicle having a beltline and a roof structure disposed above said beltline, said quarter window system comprising:

a quarter window having an exterior face, an interior face, a front peripheral edge, a bottom peripheral edge and a rear peripheral edge;

a first guiding mechanism attached to said roof structure;

a connector coupled to said quarter window for interfacing with said first guiding mechanism; and an actuator coupled to said connector operable to retract said quarter window toward said roof structure adjacent thereto and operable to extend said quarter window to a position with said bottom peripheral edge thereof disposed against said beltline of said automotive vehicle.

20. The quarter window system of claim 19 wherein:

said actuator includes a fractional horse power dc motor.

21. The quarter window system of claim 20 further comprising:

a channel attached to said rear peripheral edge of said quarter window;

said first guiding mechanism having a longitudinal arcuate shape; and said connector including a first engagement device coupled to said channel for slidable engagement with said first track.

22. The quarter window system of claim 21 wherein said connector also includes:

a cable movably engaged with said motor and further having a distal end thereof connected to said channel which is attached to said quarter window, said motor movably driving said cable for retracting and extending said quarter window.

23. The quarter window system of claim 22 wherein:

said cable is slidable within said first guiding mechanism.

24. The quarter window system of claim 19 further comprising:

a second guiding mechanism having a longitudinal arcuate shape, said second guiding mechanism being attached to said roof structure;

a member extending substantially rearwardly from said quarter window;

a second engagement device attached to said member extending from said quarter window for slidable engagement with said second guiding mechanism.

25. The quarter window system of claim 24 wherein:

said second guiding mechanism has a pair of stand off segments and a cam segment disposed therebetween, said pair of stand off segments being attached to said roof structure such that said cam segment is displaced away therefrom; and said second engagement device slidably interfaces with a portion of said cam segment in registry therewith and slidably moves therealong during retraction and extension of said quarter window.

26. The quarter window system of claim 25 wherein:

said second engagement device includes a clip and a yoke, said clip slidably interfacing with said cam segment of said second guiding mechanism and said yoke being rotatably attached to the clip, said yoke being further rotatably attached to said member extending from said quarter window.

27. The quarter window system of claim 24 wherein:

said first and second guiding mechanism have a C-shaped cross-sectional configuration within which the corresponding of said first and second engagement devices are slidably engagable.

28. A quarter window system for use in an automotive vehicle having a beltline and having a roof structure disposed above said beltline, said quarter window system comprising:

a quarter window having an exterior face, an interior face, a front peripheral edge, a bottom peripheral edge and a rear peripheral edge;

a first guiding mechanism attached to said roof structure and including a track;

a second guiding mechanism attached to said roof structure;

a connector coupled to said quarter window for interfacing with said first guiding mechanism, said connector including a cable and a first engagement device attached proximate with a distal end thereof;

a member extending substantially rearwardly from said quarter window;

a second engagement device attached to said member for slidable engagement with said second guiding mechanism; and an electric motor coupled to said cable operable to retract said quarter window toward said roof structure adjacent thereto and operable to extend said quarter window to a position with said bottom peripheral edge thereof disposed adjacent said beltline of said automotive vehicle.

* * * * *

UNITED STATES PATENT AND TRADEMARK OFFICE
CERTIFICATE OF CORRECTION

PATENT NO. : 5,456,516
DATED : October 10, 1995
INVENTOR(S) : Michael P. Alexander and Stephen P. Tokarz It is certified that error appears in the above-identified patent and that said Letters Patent is hereby corrected as shown below:

Column 4, line 12, "46" should be -- 346 --.

Column 4, line 15, "42" should be -- 342 --.

Signed and Sealed this

Thirtieth Day of January, 1996

Attest:

BRUCE LEHMAN

Attesting Officer

Commissioner of Patents and Trademarks